(12) United States Patent
Singh

(10) Patent No.: US 9,146,707 B2
(45) Date of Patent: Sep. 29, 2015

(54) GENERATING A FAST 3X MULTIPLICAND TERM FOR RADIX-8 BOOTH MULTIPLICATION

(71) Applicant: International Business Machines Corporation, Armonk, NY (US)

(72) Inventor: Deepak K. Singh, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 13/903,186

(22) Filed: May 28, 2013

(65) Prior Publication Data

US 2014/0358979 A1    Dec. 4, 2014

(51) Int. Cl.
G06F 7/523 (2006.01)
G06F 7/506 (2006.01)

(52) U.S. Cl.
CPC ........ *G06F 7/506* (2013.01); *G06F 2207/5063* (2013.01)

(58) Field of Classification Search
None
See application file for complete search history.

(56) References Cited

U.S. PATENT DOCUMENTS

| | | | |
|---|---|---|---|
| 5,701,504 A | 12/1997 | Timko | |
| 5,875,125 A | 2/1999 | Hwang et al. | |
| 6,085,214 A * | 7/2000 | De Angel | 708/628 |
| 7,308,471 B2 * | 12/2007 | Rumynin | 708/628 |
| 8,417,761 B2 * | 4/2013 | Erle et al. | 708/623 |
| 2003/0182343 A1 * | 9/2003 | Hojsted | 708/625 |
| 2014/0358979 A1 * | 12/2014 | Singh | 708/209 |

OTHER PUBLICATIONS

G.A. Ruiz1 and Mercedes Granda, "Efficient hardware implementation of 3X for radix-8 encoding," Dpto. de Electrónica y Computadores. Facultad de Ciencias Universidad de Cantabria. Avda. de Los Castros s/n. 39005 Santander (Spain), Proc. of SPIE vol. 6590, 659011, (2007) • 0277-786X/07/$18 • doi: 10.1117/12.721489.

* cited by examiner

*Primary Examiner* — David H Malzahn
(74) *Attorney, Agent, or Firm* — Scully, Scott, Murphy & Presser, P.C.; H. Daniel Schnurmann

(57) ABSTRACT

A 3× circuit for partial product generation used in a radix-8 multiplier receiving only a single multiplicand input. Rather than providing 2-inputs to the adder (a 2× of multiplicand and the multiplicand itself), the new 3× circuit uses the multiplicand as the only input. Thus, in terms of connections at the multiplier circuit level, only one bus is required to connect to the input of the new 3× circuit. The 3× generation adder circuit further operates at a reduced number of logic levels and speeds up the critical path by taking advantage of the repetition and fixed spatial separation of the bits for the adder inputs.

19 Claims, 7 Drawing Sheets

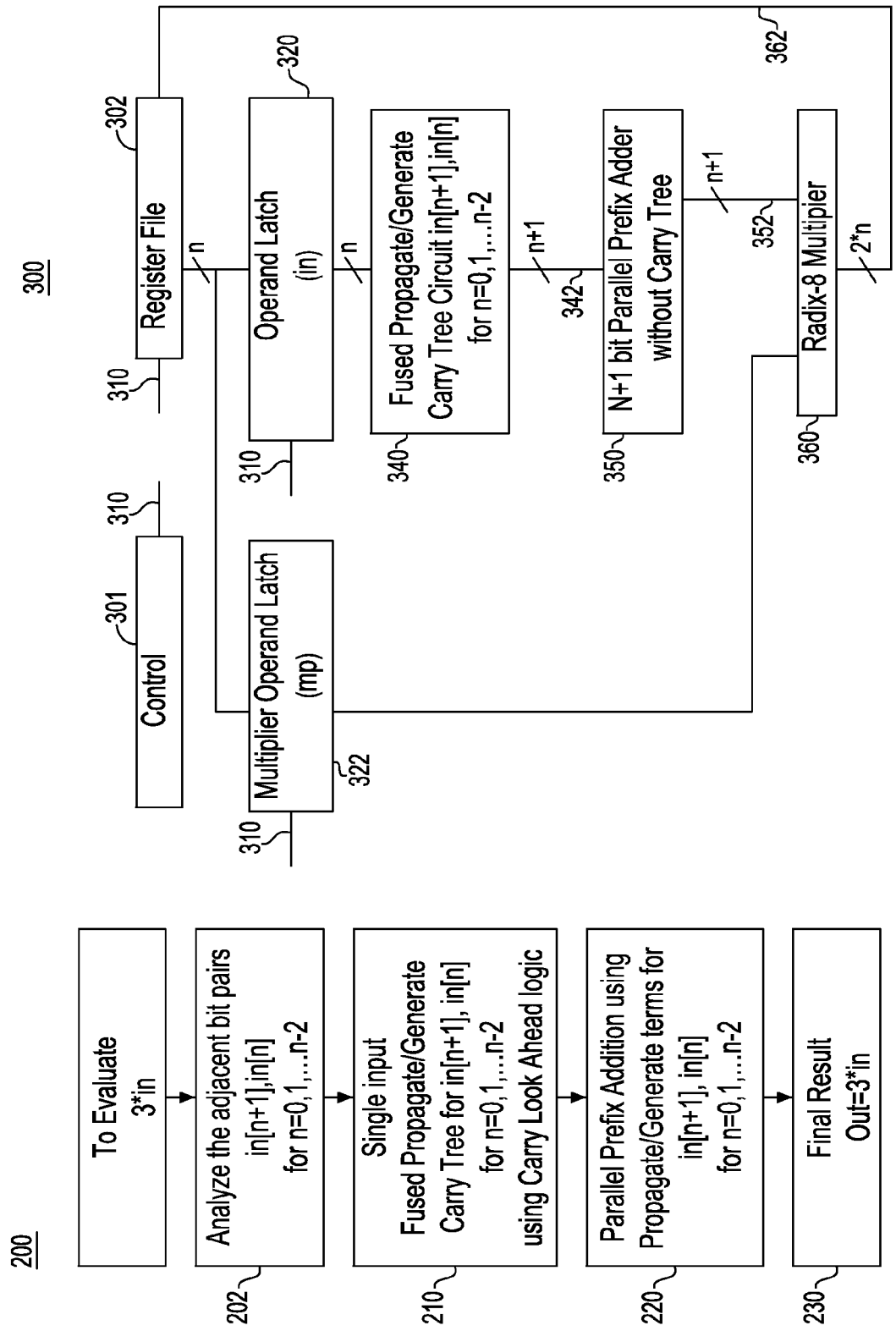

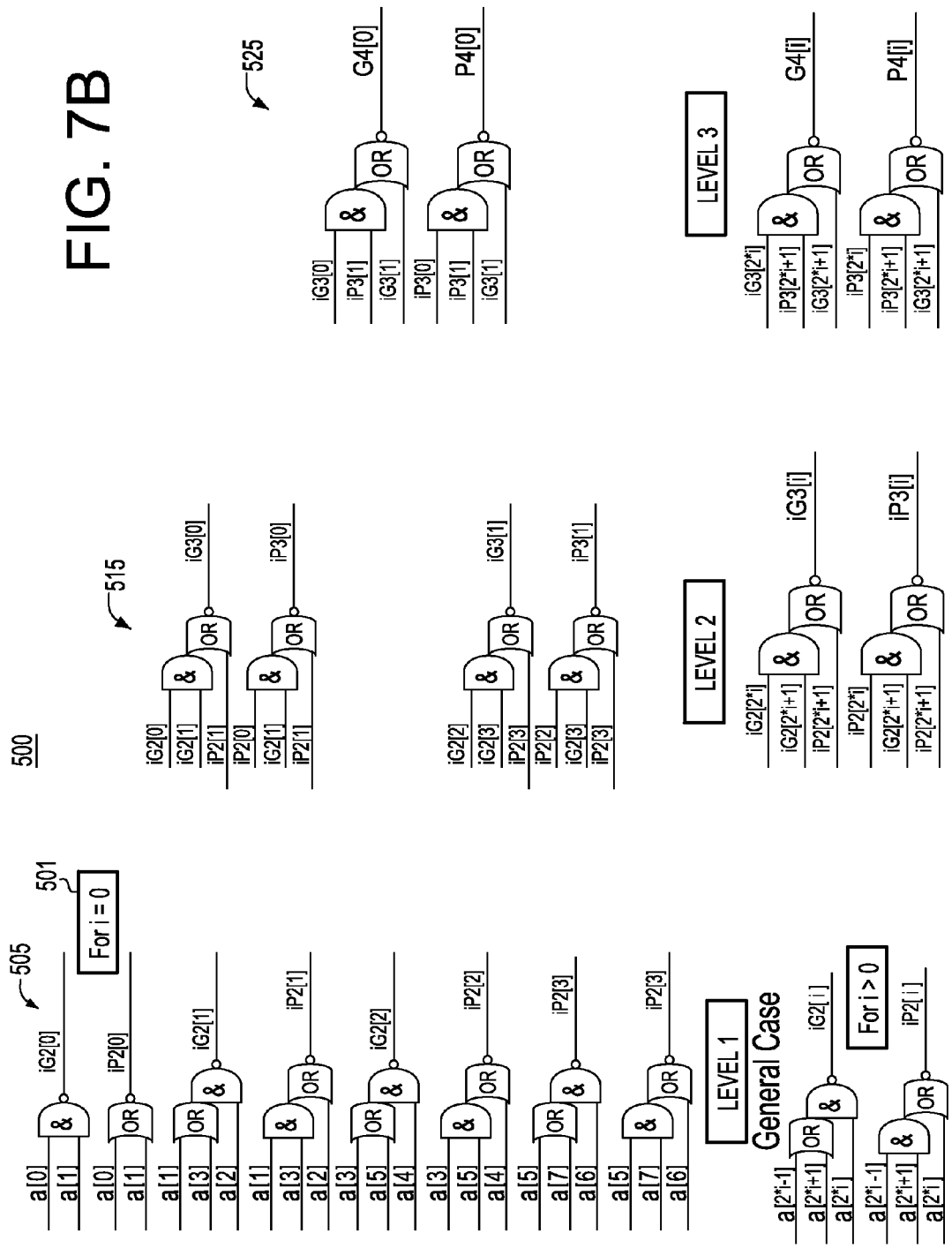

GENERATING A FAST 3X MULTIPLICAND TERM FOR RADIX-8 BOOTH MULTIPLICATION

FIELD OF INVENTION

The present disclosure relates to a system and method of generating 3× term for partial product generation in a Radix-8 Multiplier. A radix-8 multiplication method tends to reduce the number of partial products needed for producing the final result by a factor of 3, thus reducing area, power and wiring resources.

BACKGROUND

There are other uses for 3× function; typically it is used in the Partial Product Generator (PPG) for Radix-8 Booth multipliers. For performing a radix-8 Booth Multiplication, one of the input terms that the partial product generator needs is 3 times the value of the multiplicand or 3× of the multiplicand. Other terms needed by the PPG are 0, ±1×, ±2×, ±4×, but these can be generated very easily.

Although 0, ±1×, ±2×, ±3×, ±4× values of the multiplicand are needed by the PPG, only the positive values need to be created, i.e. only 1×, 2×, 3×, 4×s are needed. To create the negative values, the corresponding positive value is inverted and +1 is added to it in the later stages of the compressor tree. The 3× term generation needs some extra logic. Typically, as shown in FIG. 1 depicting a flowchart of a current 3× generation method 10 using a prior art multiplier circuit, this 3× term is generated by adding 2× of the multiplicand together with itself.

That is, in the prior art method 10, to evaluate an expression out=3*in, at 12, the method implements an adder using a Parallel Prefix addition algorithm, to add 2× the "in" multiplicand with itself to produce 3× value as indicated at 20. However, first, at 15, the 2× of the multiplicand is easily obtained by shifting the input multiplicand bits left by 1 bit position (i.e., in<<1) to produce a binary multiplication of the input by 2 using a 1-bit fixed amount shifter circuit. Thus, to evaluate the product out=3*in, i.e., obtain the multiplication of 3*in at 25, the 2*in result from the 1-bit shifter is added together with the in multiplicand using a 2-input full adder circuit. Thus the 3× partial product output is: 3× multiplicand={multiplicand<<1}+multiplicand and is available for use in the next step in the radix-8 multiplication.

FIG. 2 is a block diagram illustrating a radix-8 multiplication system 50 according to the prior art. In this embodiment, a register file 52 contains 128 n-bit wide integer words. Under the control circuitry 60 through control line 66 an integer word is loaded into the n-bit multiplicand operand latch 70. Likewise, the contents of the multiplier operand latch 65 are also loaded. The contents of the multiplier operand latch 70 are provided to a shifter 72 with a fixed shift amount of 1-bit left shift and a padding block 75 to add a bit "0" in front of the most significant bit of the output of the operand latch 70. As a result of the shifting and padding operations performed by shifter 72 and padding block 75, their corresponding outputs 76 and 78 are now n+1 bit wide data buses. For example, given a 16 bit input multiplicand, processing results in seventeen bits where the Pad 0 on MSB {1'b0,in} is such that the input is padded with a zero (bit) on the MSB side which does not change the value of the number. To multiply by two, Pad 0 on the LSB so that the input is padded with a zero on the LSB side {in, 1'b0} such that it equals 2*in.

The 2-input n+1 bit full adder 80 receives the outputs 76 and 78 from the shifter 72 and padding block 75 respectively. The full adder 80 produces the sum of the two n+1 bit input buses 76 and 78 and produces an n+1 bit sum. This sum from adder 80 is input into the radix-8 multiplier circuit 90. The radix-8 multiplier 90 also receives the contents of the multiplier operand latch 65. The radix-8 multiplier 90 performs multiplication and produces a 2*n-bit result on data bus 62. This output 62 is provided back to the register file 52 for a next operation.

But creating a 3× of the multiplicand in this way introduces a 2-input full adder whose 2 inputs are: 2× multiplicand and the multiplicand itself. Unfortunately, use of a full adder in implementing 3× is not an optimal design. For example, use of this adder, or any type of adder, e.g., a Sklansky adder, that produces the 3×=2×+1×, this calculation becomes a critical timing path.

It is desirable to speed up the 3× term generation, because the earlier it is available, the sooner the multiplication can start. The delay incurred in generating the 3× term is also dependent upon the size of the multiplicand. The 3× generation for a 64-bit multiplicand will take longer than a 32-bit multiplicand. Basically, current devices are limited by the speed of the adder. For a parallel prefix adder, such as the Sklansky adder 85 shown in FIG. 3, the delay increases as $\log_2$ (width (in bits 87) of multiplicand), i.e. delay ~$O(\log_2 n)$ with multiplicand[n-1:0]. Typically, in the prior art, the adder used is a general purpose adder 85, i.e., if this adder circuitry were to be detached from the multiplier, it can still work standalone as an adder.

Typically, the full Adder such as the Sklansky adder 85 conceptually shown in FIG. 3, has following levels of logic (assuming a 16-bit multiplicand): a first level of Propagate/Generate logic 82; an amount ($\log_2 n$)-1 levels 84 of carry tree at which a carry look-ahead is performed to predict what the carry will look like; a third level of buffering 86 for a final multiplexer; and, a final level of logic 88 for final multiplexing. Thus, a total levels of logic for increment operation=3+($\log_2 n$)-1=2+$\log_2 n$, where "n" is the width (in bits) of the multiplicand. The amount of levels is determined by the number of bits of the multiplicand. FIG. 3 also shows the critical path 92 in which processing at the four (4) logic levels occur for a 16-bit multiplicand. The amount of logic levels will increase as dependent upon the number of multiplicand bits.

FIG. 3 further shows the adder's known propagate and generate cell block 95 employed along the critical path, that includes respective logic circuits 91, 93 for providing respective Generate and Propagate values at each level with "k" representing the level, e.g., $G_k$, k=1 is the first level generate. The numbers in the parenthesis [ ] represent the bit numbers, e.g., $G_{k[1]}$, $G_{k[2]}$, for i=0, 1, ..., n-1. As known, the Generate represents AND functionality where a carry is always generated, and Propagate represents an OR functionality where a carry propagated from previous stage would be propagated to next stage. For example, in FIG. 3, the iG5 Generate term is the carry that is highlighted as the critical path 92.

In the typical n-bit adder, such as the 3×-Generation Adder according to the prior art depiction shown in FIG. 7A employing a parallel prefix adder carry tree 400, where n=16, as the adder receives two n-bit inputs a[n-1:0], b[n-1:0] and results in a sum=a[n-1:0]+b[n-1:0]. For such an adder, the internal carry tree 400 providing iG1[i], G2[i], iG3[i], iP1[i], P2[i], iP3[i] are expressed in terms inputs a[i], b[i] where "i" is each bit.

For example:

$iG1[i] =$

!($a[i]$ && $b[i]$): These are the internal inverted Generate terms;

$iP1[i] = \,!(a[i] \| b[i])$: These are the internal inverted Propagate terms;

$G2[i] = \,!(((iG1[i]\|iP1[i+1]) \,\&\&\, iG1[i+1]) =$ $!((!(a[i] \,\&\&\, b[i])\|!(a[i+1]\|b[i+1])) \,\&\&\,$ $(!(a[i+1] \,\&\&\, b[i+1]));$ and $P2[i] = \,!(((iP1[i]\|iP[i+1]) \,\&\&\, iG1[i+1]) =$ $!((!(a[i]\|b[i])\|!(a[i+1]\|b[i+1])) \,\&\&\, (!(a[i+1] \,\&\&\, b[i+1]));$ where the "i" in front of iG1 represents an INVERT, ! represents a logic INVERT operation, && represents an AND logic operation and || represents an OR logic operation.

In FIG. 7A, first level AND and OR gate processing 405 provides first level Generate terms iG1[ ] and first level Propagate terms iP1[ ] based on the two received inputs a[ ] and b[ ] (processing shows only first 4 bits being processed). The first level Generate terms iG1[ ] and first level Propagate terms iP1[ ] proceed as inputs to the next level of the carry tree where second level AND and OR gate processing 410 provides second level Generate terms G2[ ] and second level Propagate terms P2[ ] associated with the G2[i] and P2[i] calculations above. The process continues through third level processing 415 and fourth level processing 420 until final level Generate terms G4[ ] and Propagate terms P4[ ] are output.

By using this full adder in partial product generation, the prior art also exhibits increased area, power and wiring resources. Overall, the use of a 2-input full adder in the prior art does not result in an optimized implementation.

SUMMARY

A system and method for replacing the 2-input full adder circuitry used in 3× generation circuitry by a new and efficient 3× adder circuit that uses only one input.

The 3× circuit is a specialized circuit where the output of the circuit is always 3× of the value presented at its input as it obviates the need to produce a sum of 2 values, unlike the general purpose 2-input adder circuit. The efficient 3× generation adder operates at a reduced number of logic levels speeds up the critical path by taking advantage of the repetition and fixed spatial separation of the bits for the adder inputs.

In the 3× circuit, there is provided only a fixed function circuit to produce a 3× term needed for radix-8 booth multiplication. Using a new and efficient 3× circuit, the overall method of radix-8 multiplication thus exhibits increased efficiency.

The system and method thus provides optimizations that can be made to speed up the 3× generation. Since the 2 inputs to the full adder are derived from the same multiplicand, the new 3× circuit takes into account the fixed separation and repeated values in the bits of the 2 inputs to the adder relative to each other. That is, the new and efficient 3× circuit that uses only one input takes into account the logical and spatial relationship between the bits of the multiplicand and uses it to eliminate a level of logic in the critical path, thus achieving higher clock frequency for the chip.

In one aspect, there is provided a 3× generation circuit comprising: an input for receiving a single n-bit multiplicand comprising bits a[n−1:0]; a logic device for isolating groups of adjacent bits of the single n-bit multiplicand, wherein adjacent bits of each group includes a bit a[i] corresponding to a bit location of the single n-bit multiplicand, and an adjacent bit a[i+1] of the group corresponds to a bit shifted representation of the single n-bit multiplicand, and an adjacent bit a[i−1], the groups of adjacent bits being obtained for i=0, 1, . . . n−2; a parallel prefix adder device employing levels of logic gates forming a carry tree circuit, a first level of logic gates receiving the groups of obtained adjacent bits a[i+1], a[i], a[i−1] for bits i=0, 1, . . . n−2 of the single n-bit multiplicand input, and successively generating, at each level, corresponding Generate terms and Propagate terms and corresponding carry bits resulting from processing the groups at the one or more processing logic levels, the parallel prefix adder device performing an addition based on the generated Generate and Propagate terms and corresponding carry bits, wherein an output of the addition comprise bits of a value corresponding to 3× the single n-bit multiplicand.

In a further aspect, there is provided a 3× generation method comprising: receiving a single n-bit multiplicand comprising bits a[n−1:0], isolating groups of adjacent bits of the single n-bit multiplicand, adjacent bits of each group including a bit a[i] corresponding to a bit location of the single n-bit multiplicand, and an adjacent bit a[i+1] of the group corresponds to a bit shifted representation of the single n-bit multiplicand, and an adjacent bit a[i−1], the groups of adjacent bits being obtained for i=0, 1, . . . n−2; employing, in a parallel prefix adder device, levels of logic gates forming a carry tree circuit, a first level of logic gates receiving the groups of obtained adjacent bits a[i+1], a[i], a[i−1] for bits i=0, 1, . . . n−2 of the single n-bit multiplicand input, and successively generating, at each level, corresponding Generate terms and Propagate terms and corresponding carry bits resulting from processing the groups at the one or more processing logic levels, the parallel prefix adder device performing an addition based on the generated Generate and Propagate terms and corresponding carry bits, wherein an output of the addition comprise bits of a value corresponding to 3× the single n-bit multiplicand.

In a further aspect, there is provided a Radix-8 Booth multiplier device comprising: a Radix-8 Partial Product Generator circuit (PPG) employing a multiplexor device for receiving each of prior computed 1×, 2×, 4× times partial product values of a single n-bit multiplicand; a 3× generation circuit, the 3× generation circuit comprising: an input for receiving the single n-bit multiplicand comprising bits a[n−1:0]; logic device for isolating groups of adjacent bits of the single n-bit multiplicand, wherein adjacent bits of each group includes a bit a[i] corresponding to a bit location of the single n-bit multiplicand, and an adjacent bit a[i+1] of the group corresponds to a bit shifted representation of the single n-bit multiplicand, and an adjacent bit a[i−1], the groups of adjacent bits being obtained for i=0, 1, . . . n−2; a parallel prefix adder device employing levels of logic gates forming a carry tree circuit, a first level of logic gates receiving the groups of obtained adjacent bits a[i+1], a[i], a[i−1] for bits i=0, 1, . . . n−2 of the single n-bit multiplicand input, and successively generating, at each level, corresponding Generate terms and Propagate terms and corresponding carry bits resulting from processing the groups at the one or more processing logic levels, the parallel prefix adder device performing an addition based on the generated Generate and Propagate terms and corresponding carry bits, wherein an output of the addition comprise bits of a value corresponding to 3× the single n-bit multiplicand, the multiplexor device receiving the output 3× value as a 3× partial product value of the single n-bit multiplicand; and an encoding device providing select control signals for input to the multiplexor device to obtain one or more computed 1×, 2×, 3, and 4× partial product terms needed for a radix-8 booth multiplication operation.

BRIEF DESCRIPTION OF THE DRAWINGS

The present invention will be understood and appreciated more fully from the following detailed description of the invention, taken in conjunction with the accompanying drawings of which:

FIG. 5 illustrates a flow chart of the preferred 3× generation method of the present embodiment;

FIG. 6 is a block diagram illustrating the preferred 3× generation method the present embodiment;

FIG. 7B depicts a configuration of the modified Propagate/Generate Carry Tree circuit implementation example 4-level Propagate/Generate Carry Tree Circuit (for 16 bit multiplicand) of the present embodiment; and, FIG. 8 shows the bit structure of the LSB padded (2× multiplicand) {a[n-1:0], 1'b0} and the MSB padded multiplicand input {1'b0,a[n-1:0]}.

DETAILED DESCRIPTION

Figure 2:
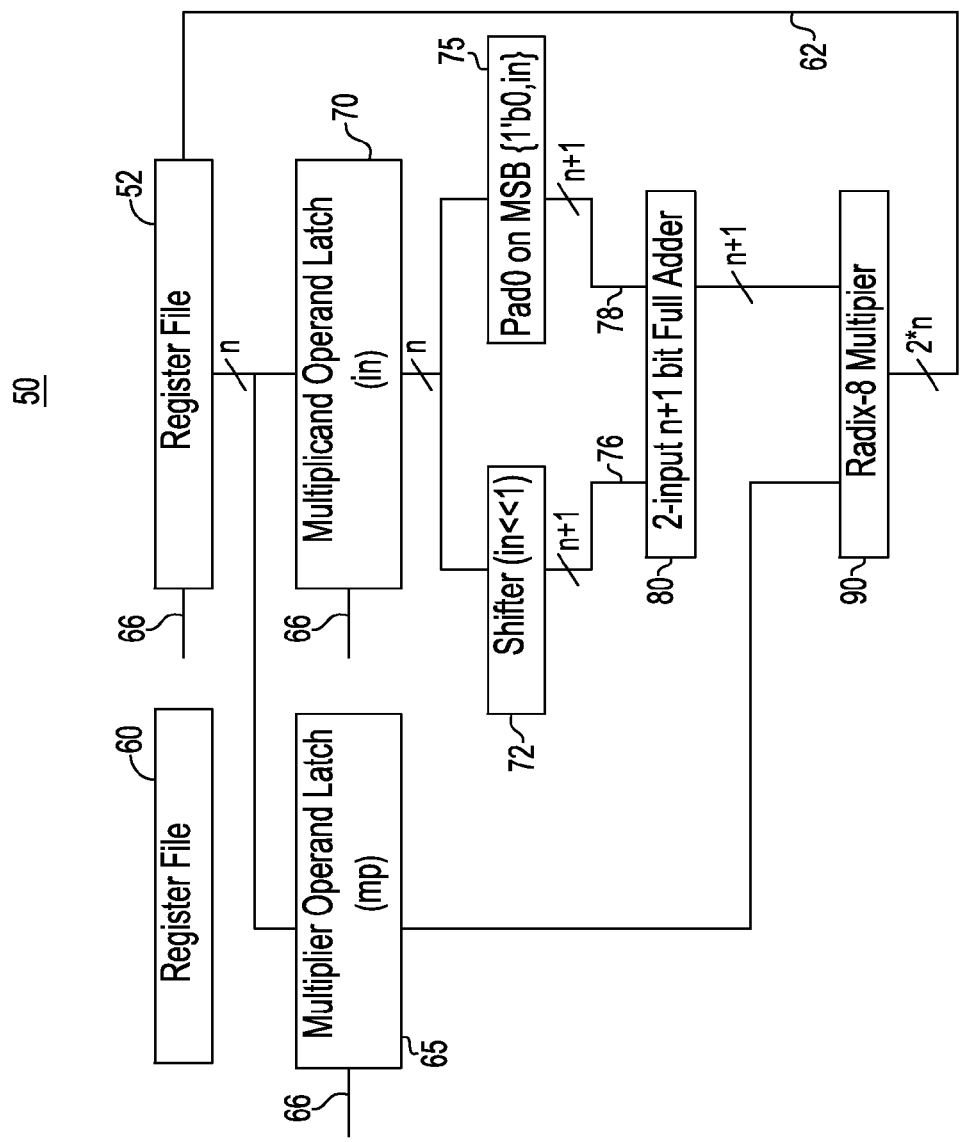
FIG. 2 is a block diagram illustrating 3× generation method using prior art.
Figure 1:
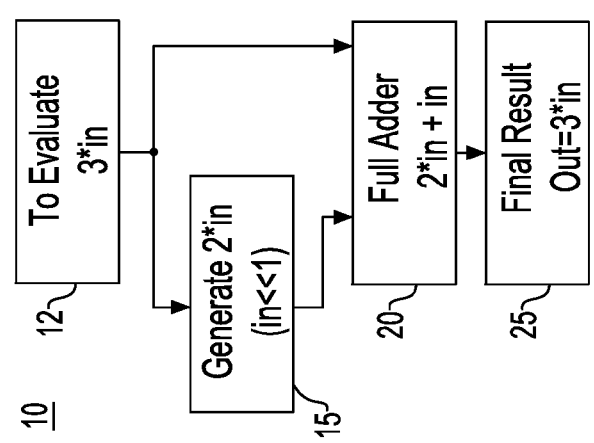
FIG. 1 is a flowchart illustrating 3× generation method using a prior art 3× multiplier circuit.
Figure 3:
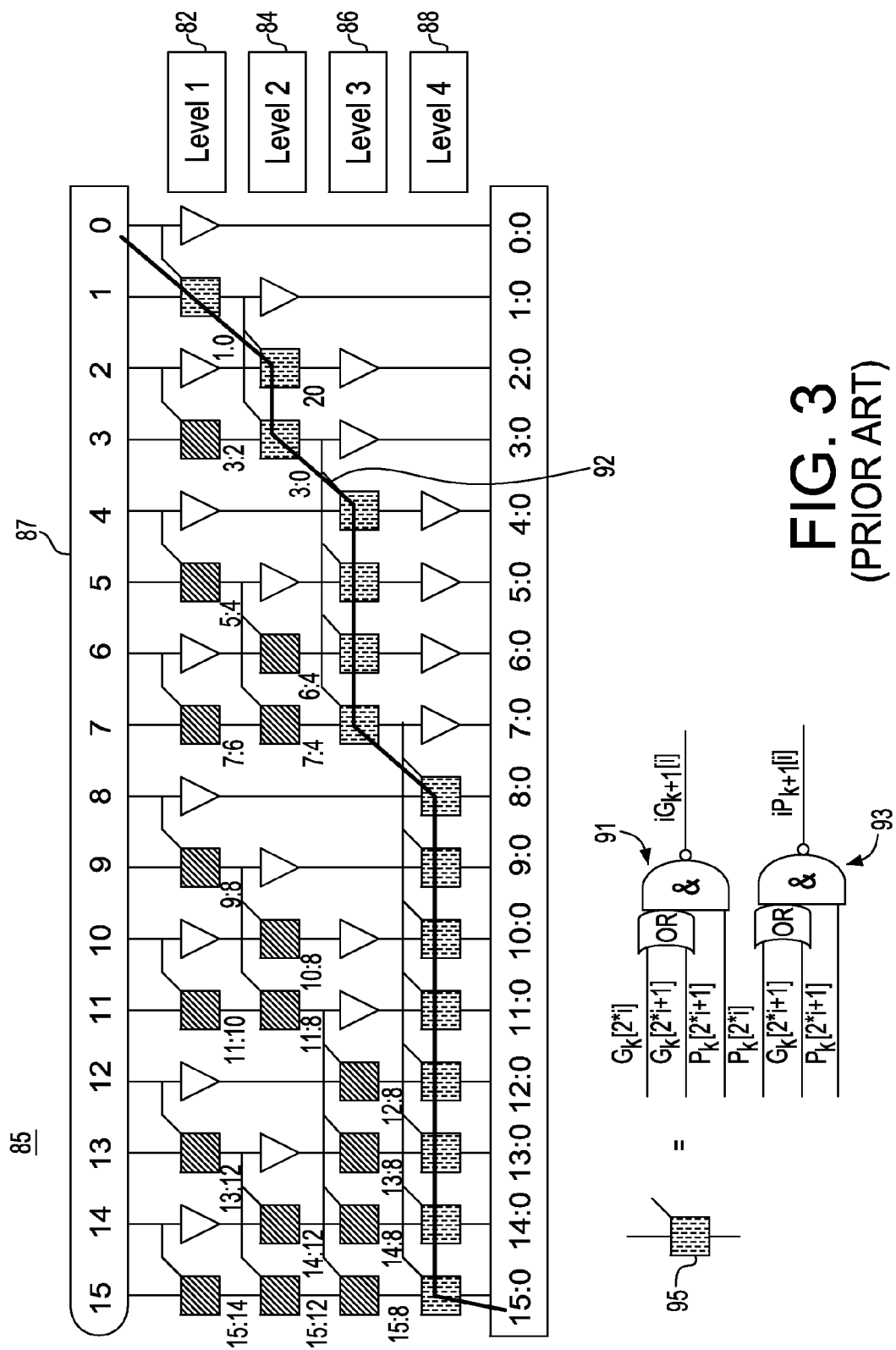
FIG. 3 shows a typical depiction of a parallel prefix adder such as the Sklansky adder circuit and a critical path processing.
Figures 4A, 4B:
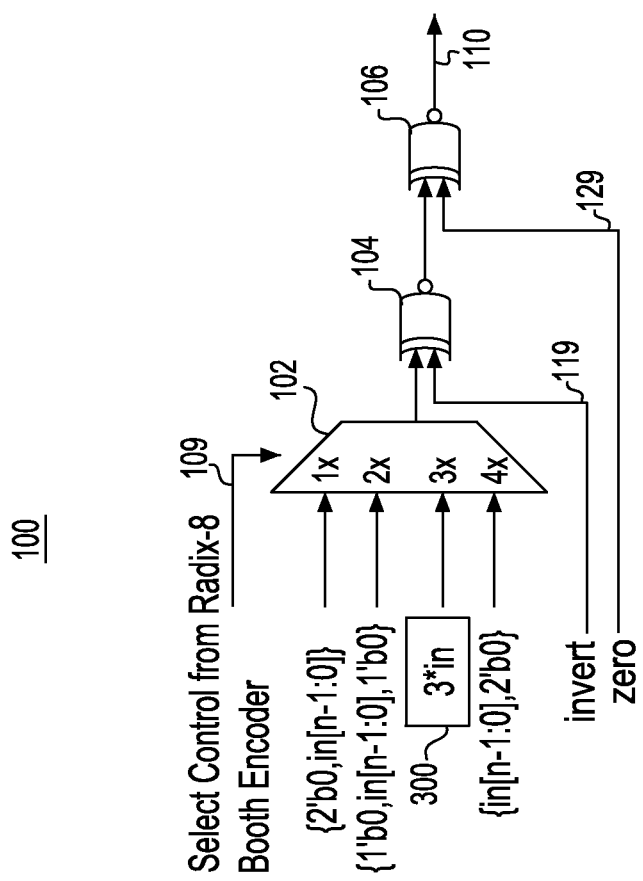
FIG. 4A is an implementation of a partial product generator (PPG) 100 in which the present 3× circuit embodiment of the invention is implemented.
FIG. 4B is an implementation of the logical truth table implemented for producing the partial product output in the PPG of FIG. 4A.

FIG. 4A is a Block Diagram of Radix-8 Partial Product Generator circuit (PPG) 100 in which the present 3× circuit 300 of the invention is implemented. As shown in FIG. 4A, a 4:1 multiplexer ("mux") 102 receives the computed 1×, 2×, 4× times the multiplicand values from the operand latch, and also receives the 3× times the multiplicand value generated by generator 300. The output from mux 102 depends upon the select control signals 109 from a known Radix-8 Booth Encoder (not shown) and the output is placed at the input of the XNOR gate 104 which is used to produce a conditional inversion of the mux 102 output based upon received invert control signal 119 from the Booth encoder. This conditional inversion is needed to produce any −1×, −2×, −3× and −4× partial product terms needed for the radix-8 booth multiplication.

For ex: −2×=~(2×)+1. In this case, the mux selects 2×, invert=HIGH, zero=LOW so that XOR+NOR gate inverts 2× to give ~(2×). And +1 is added to it somewhere down the compressor tree.

The output of XNOR gate 104 is received at the input of NOR gate 106 to produce the partial product output 110 of correct polarity which can also be conditionally zeroed out based upon the zero control signal 129 also received from the Booth encoder. This partial product output 110 is then sent to a compressor tree (not shown) according to known embodiments. It is understood that, any implementation of bits may be processed by this method.

The table shown in FIG. 4B is the logical truth table 150 for producing the partial product output 110 of FIG. 4A based upon the control signals from the Booth encoder.

FIG. 5 is a flowchart illustrating a more efficient 3× generation method 200 according to one embodiment;

In the method 200 of FIG. 5 to obtain the multiplication of 3*in, where the multiplicand "in" is of "n" bits, a first step 402 is directed to analyzing the n-bit input to take into account the logical and spatial relationship between the bits of the multiplicand. More particularly, the method, under computer processor control, analyzes the adjacent bit pairs in[n+1], in[n] for n=0, 1, . . . n−2.

Then, at step 210, the result from the logical and spatial relationship between multiplicand bits is used to create propagates, generates and carries using fused Propagate/Generate Carry tree. In particular, there is implemented at 210, the Single input Fused Propagate/Generate Carry Tree for in[n+1], in[n] for n=0, 1, . . . n−2 using Carry Look Ahead logic.

Then, at step 220, the Propagate, Generate and carry outputs of the fused Propagate/Generate Carry tree in step 210 are used to perform the 3× calculation on the single multiplicand input. In particular, at 220, there is implemented a Parallel Prefix Addition using Propagate/Generate terms for in[n+1], in[n] for n=0, 1, . . . n−2. The 3× output of step 230 is then made available for use in the next step in the radix-8 multiplication. Thus by looking at adjacent bit pairs (of the input), and the determining if an individual bit propagates then the first level processing is unnecessary and processing begins at second level. That is, it is possible to merge iG1[ ] and G2[ ] equations to a single equation, such that inputs in[i], in[i+1] for n=0, 1, . . . n−2 are used to produce G2[ ] and P2[ ], thus eliminating 1 level of logic needed to produce iG1[ ], iP1[ ].

In view of this, the result of analysis in step 202 determines the $\log_2 n+1$ level in the carry tree. The method of analyzing adjacent bit pairs step involves looking at 3 adjacent bits at a time a[n+1], a[n], a[n−1], and additionally to find out how many such groups of 3 adjacent bits are needed.

For example: for an input multiplicand "in" 16-bits wide, then the analysis determines seven (7) groups of 3-adjacent bits for iG2[7:1] and one more group for iG2[0]. Similarly, there will be determined the need for 7 groups of 3-adjacent bits for iP2[7:1] and one more group for iP2[0].

In another example, if the input "in" is 32-bits wide, then the analysis determines 15 groups of 3-adjacent bits for iG2[15:1] and one more group for iG2[0]. Similarly, there will be determined the need for 15 groups of 3-adjacent bits for iP2[15:1] and one more group for iP2[0].

The results of analysis in step 202 also determine how many logic gates are involved in the carry tree.

For example, as the number logic gates are involved in the carry tree are reduced because there are no iG1[ ] and iP1[ ] terms in the carry tree as described herein, the value of i for the summation starts with 1 (instead of 0).

$$\sum_{k=1}^{\log_2 n} (n/2^k)$$

such that, in case of n=16, the method obtains $\log_2 n = \log_2 16 = 4$ $$\sum_{k=1}^{\log_2 n} (n/2^k) = 16/2 + 16/4 + 16/8 + 16/16 = 15 \text{ gates}$$

$$8 \; G2 \quad 4 \; iG3 \quad 2 \; G4 \quad 1 \; iG5 = 15 \text{ gates}$$

Similarly, for Propagate terms, there will also be determined need for 15 gates.

Via a program (or a script) or like automated way of creating a gate level netlist or schematic of the carry tree, this information is used to create the appropriate number of groups in the first level (G2 and P2) of the carry tree.

FIG. 6 is a block diagram illustrating on embodiment of the 3× generation method implemented in the present 3× circuit 300 of the invention.

In the preferred embodiment, register file 302 contains 128 n-bit wide integer words. Under the control circuitry 301 through control line 306 an integer word is loaded into the n-bit multiplicand operand latch 320. Likewise, the contents of the multiplier operand latch 322 are also loaded. The contents of the multiplier operand latch 320 are provided to a fused Propagate/Generate Carry tree 340 which produces n+1 bit propagates, generates and carries shown as data bus 342. In particular, at 340, the fused Propagate/Generate Carry Tree Circuit in[n+1],in[n] for n=0, 1, ... n−2 is invoked. Details regarding operation of the fused Propagate/Generate Carry Tree Circuit are described with respect to FIGS. 7B and 8. The result data bus 342 from Propagate/Generate Carry tree 340 is placed at the input of a parallel prefix adder without the carry look-ahead tree 350 that selects the propagates and generates based upon the carries and produces a n+1 bit sum equal to 3× of the multiplicand represented by data bus 352. This 3× multiplicand 352 from adder 350 is input into the radix-8 multiplier circuit 360.

The radix-8 multiplier 360 also receives the contents of the multiplier operand latch 322. The radix-8 multiplier performs multiplication and produces a 2*n-bit result on data bus 362. This output 362 is provided back to the register file 302 for next operation.

Thus, in the modified 3× circuit, rather than providing 2-inputs to the adder (a 2× of multiplicand and the multiplicand itself), the new 3× circuit uses the multiplicand as the only input. Thus, in terms connections at the multiplier circuit level, prior art connects 2 separate buses to the inputs of a 2-input adder, whereas the described system only connects 1 bus to the input of the new 3× circuit.

Reduction in 1 level of logic is possible by eliminating the Propagate/Generate logic from the carry tree critical path resulting in the fused Propagate/Generate Carry Tree Circuit. This is possible because the input bits to the 3× adder, {multiplicand<<1} and multiplicand, are spatially separated by 1-bit, thus allowing the equations that use bit[i+1], bit[i] and bit[i−1] to be further optimized, resulting in one less logic level.

Figure 7A:
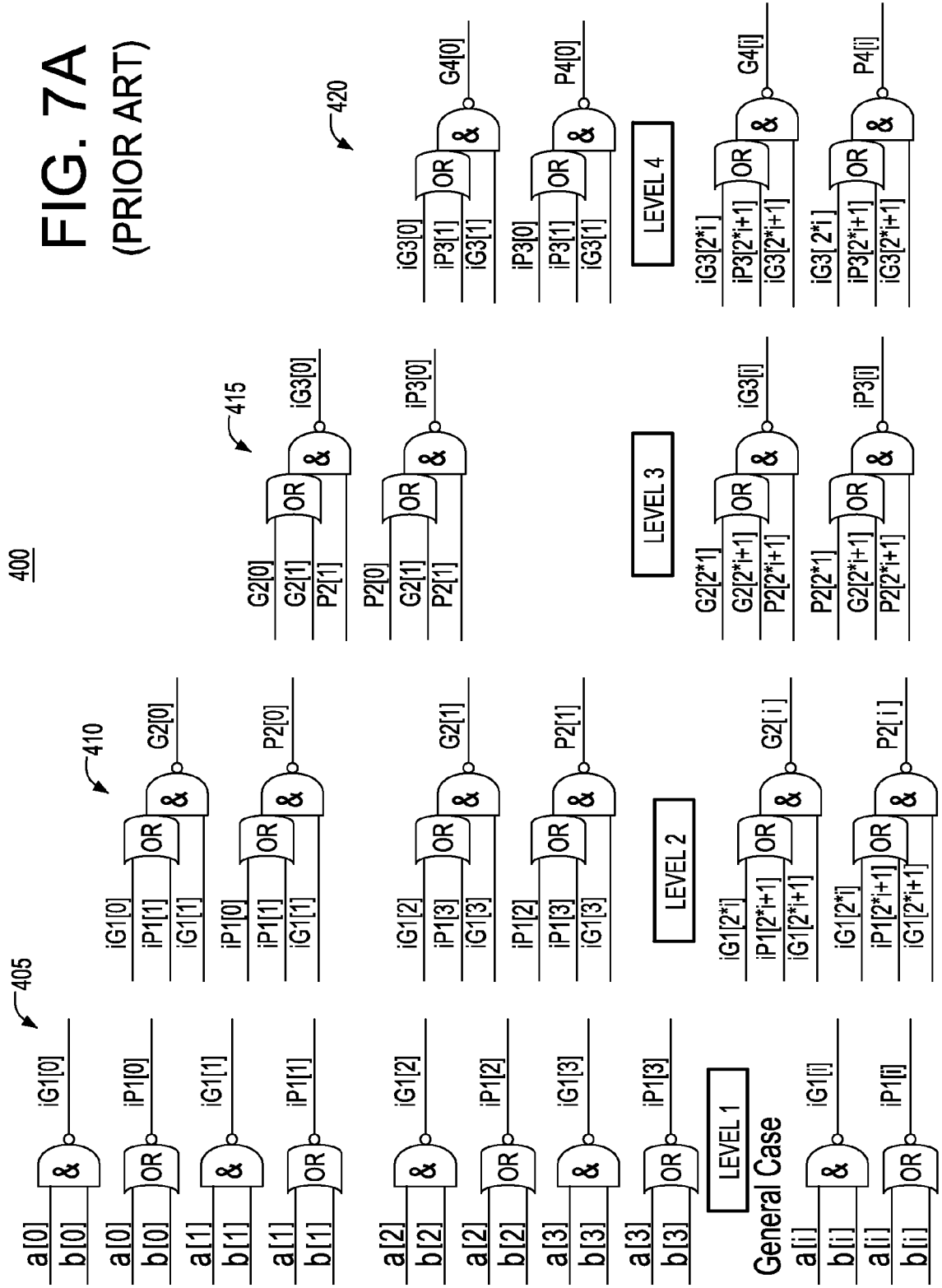
FIG. 7A is a prior art depiction of a typical n-bit adder employing an example 4-level parallel prefix adder Propagate/Generate Carry Tree Circuit, such as for the 3×-Generation Adder according to the prior art.

A configuration of the modified (fused) Propagate/Generate Carry Tree circuit 500 implementation is shown in FIG. 7B, as compared to the prior art example 4-level Propagate/Generate Carry Tree Circuit (for 16 bit multiplicand) of FIG. 7A.

Figure 8:
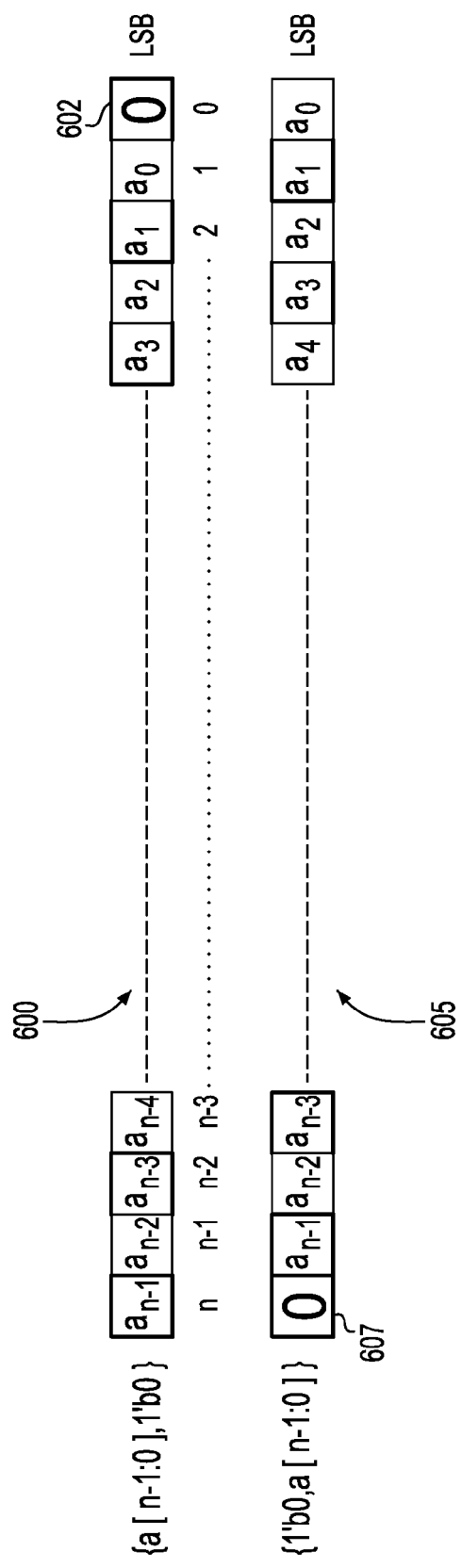

In the modified n-bit adder implementation of FIG. 7B, when an n-bit adder needs to produce the sum=3*input, the inputs are {1'b0,a[n−1:0]}, {a[n−1:0],1'b0} such that: { a[n−1:0],1'b0}=2*a[n−1:0] and {1'b0,a[n−1:0]}=a[n−1:0]. This is depicted in FIG. 8 showing the bit structure 600 of the single input multiplicand "a[n−1:0]" shifted one bit by the LSB padded (2× multiplicand) {a[n−1:0],1'b0} showing the added logic 0 padding bit 602 and the bit structure 605 of the MSB padded multiplicand input {1'b0,a[n−1:0]} showing the added logic 0 padding bit 607. The shifting happens after the analysis groups of 3 adjacent bits a[n+1], a[n], a[n−1] are determined. Thus, the padding and shifting performed in hardware by wiring the adjacent bits to the logic gates. The hardwiring is configurable depending upon the amount of groups that is determined from the number of bits in the single input multiplicand "in".

Thus, it is noted that 3× adder does not receive input b[n−1:0]; it only receives single input a[n−1:0], and shifts it to perform 2×, thus only requiring a single bus connection to the input of the new 3× circuit. This results in iG1[i], iP1[i] equations needing only sequential bits belonging to input "a" i.e., a[i], a[i+1] bits). That is, input b[i] is just a shifted version of a[i]; thus b[i]=a[i−1]; similarly b[i+1]=a[i] for i=1, 2, ... n−1 and b[0]=0.

Using this information, in the modified fused Propagate/Generate Carry Tree Circuit 500 of FIG. 7B, there is merged iG1 and G2 equations to a single equation, such that the inputs a[i−1], a[i], a[i+1] are used to produce G2[i] and P2[i], thus eliminating the first level (level 1) of logic needed to produce iG1[i], iP1[i].

This is shown in FIG. 7B where given one multiplicand input as:

$$a[n-1:0].$$

Given the prior art adder expressions for first level inverted Generate terms and inverted Propagate terms:

$$iG1[i]=!(a[i]\&\&b[i])$$

$$iP1[i]=!(a[i]\|b[i])$$

for i=0, as indicated at 501, i.e., for a first bit [0], the method performs substituting a[i]=a[0] and b[i], b[0]=0=1'b0, which results in:

$$iG1[0]=!(a[0]\&\&1'b0)=1'b1$$

$$iP1[0]=!(a[0]\|1'b0)=!a[0].$$

However, the inputs to the adder are expressed as original input a[ ], (b[i] is a shifted version of a[i] and equal to a[i−1]; and b[0]=0), the equations used to generate the first level terms are obviated; that is, the fused Propagate/Generate Carry Tree Circuit 500 is configured to run modified equations at 505 for generating second level Generate and Propagate terms by replacing any b[i] terms with the corresponding generated input a[i−1] and b[0]=0. Thus, each of the first level tree Generate and Propagate terms iG1[ ] and iP1[ ] are expressed in terms of original inputs a[ ] as follows:

$$iG1[i]=!(a[i]\&\&a[i-1]) \text{ For ex: } iG1[1]= !(a[1]\&\&a[0])$$

$$iP1[i]=!(a[i]\|a[i-1]) \text{ For ex: } iP1[1]=!(a[1]\|a[0])$$

$$iG1[i+1]=!(a[i+1]\&\&a[i]) \text{ For ex: } iG1[2]= !(a[2]\&\&a[1]) \text{ and } iG1[3]=!(a[3]\&\&a[2])$$

$$iP1[i+1]=!(a[i+1]\|a[i]) \text{ For ex: } iP1[2]=!(a[2]\|a[1]) \text{ and } iP1[3]=!(a[3]\|a[2]).$$

Further, given the expression for generating second level Generate terms:

$$G2[1]=!((iG1[2]\|iP1[3])\&\&iG1[3])$$

which it is generally noted results from the computed expression:

$$G2[i]=!((iG1[2*i]\|iP1[2*i+1])\&\&iG1[2*i+1])$$

there is computed by the modified circuitry 505, for bit i=1 and expressed in terms of original inputs a[ ]:

$$= !iG1[2] \&\& !iP1[3] || !iG1[3] =$$
$$(a[2] \&\& a[1]) \&\& (a[3]||a[2]) || (a[3] \&\& a[2]) =$$
$$a[3] \&\& a[2] \&\& a[1] || a[2] \&\& a[1] || a[3] \&\& a[2] =$$
$$a[2] \&\& (a[3] \&\& a[1] || a[3]) = a[2] \&\& (a[3] || a[1])$$

Thus G2[i] can be represented using three consecutive bits from the input a[n−1:0] as shown in FIG. 7B with the circuitry providing the substitutions. Additionally, the G2[i] term is obtained from the consecutive bits a[i+1], a[i], a[i−1], without any first level logic processing.

The more general form for the modified internal carry tree circuit calculation 505 Generate term for a given single input multiplicand a[n−1:0] can be re-written according to equation 1) as follows:

$$G2[i] = a[2*i] \&\& (a[2*i+1] || a[2*i-1]) \text{ for } i=1,2,\ldots n/2;$$

$$G2[0] = a[0] \&\& a[1] \quad \quad 1)$$

requiring only a single level of logic processing to produce.

Likewise, given the expression for generating second level Propagate terms:

$$P2[1] = !((iP1[2] || iP1[3]) \&\& iG1[3])$$

which, it is generally noted, results from the computed expression:

$$P2[i] = !((iP1[2*i] || iP1[2*i+1]) \&\& iG1[2*i+1])$$

there is computed by the modified internal carry tree circuit calculation circuitry 505 for bit i=1 and expressed in terms of original input a[ ]:

$$= !iP1[2] \&\& !iP1[3] || !iG1[3] =$$
$$(a[2] || a[1]) \&\& (a[3] || a[2]) || (a[3] \&\& a[2]) =$$
$$a[3] \&\& a[2] || a[3] \&\& a[1] || a[2] || a[2] \&\& a[1] || a[3] \&\& a[2] =$$
$$a[3] \&\& a[2] || a[3] \&\& a[1] || a[2] || a[3] \&\& a[2] =$$
$$a[2] || a[3] \&\& a[1] || a[3] \&\& a[2] = a[2] || (a[3] \&\& a[1])$$

Thus, P2[i] can be represented using three consecutive bits a[i+1], a[i], a[i−1] from the input a[n−1:0].

The more general form for the modified internal carry tree circuit calculation 505 Propagate term for a given single input multiplicand a[n−1:0] can be re-written as according to equation 2) as follows:

$$P2[i] = a[2*i] || (a[2*i+1] \&\& a[2*i-1]) \text{ for } i=1,2,\ldots n/2;$$

$$P2[0] = a[0] || a[1] \quad \quad 2)$$

It is understood that if there are more input multiplicand bits, there will be more G2 and P2 terms.

The modified internal carry tree circuit 500 of FIG. 7B further provides a second level of processing 515 implementing AND-OR-INVERT gates to generate Generate and Propagate terms iG3[ ], iP3[ ] based on the first level generated iG2[ ], iP2[ ] terms based on single input a[ ]. It is understood that the calculating of iG3[ ] and iP3[ ], and later Generate and Propagate terms are as provided as in the prior art adder.

A final third level of processing 525 in FIG. 7B, shows the generation of final level Generate and Propagate terms G4[ ] and P4[ ] which are used to calculate further iG5 and iP5 terms.

Thus, a reduction in one level of logic is achieved by eliminating the first level Propagate/Generate logic of FIG. 7A. That is, the hardwiring of groups of adjacent bits from the single input multiplicand to the modified (fused) Propagate/Generate Carry Tree circuit 500 implementation is shown in FIG. 7B is performed according to the equations 1) and 2) herein. This is possible because the input bits to the 3× adder, {multiplicand<<1} and multiplicand, are spatially separated by 1-bit, thus allowing the equations that use bit[i+1], bit[i] and bit[i−1] to be further optimized, resulting in one less logic level. This in turn reduces 1 level of logic from the carry tree critical path, thus speeding up the adder.

The current invention introduces a new method of producing 3× times multiplicand (i.e., out=3*in) and focuses on improving the throughput, area, power and wiring for the overall implementation of a radix-8 multiplier by reducing one level of logic for the add operation that generates 3× multiplicand resulting in: an amount of $(\log_2 n)-1$ levels of carry tree; 1 level of buffering for final mux; and 1 level of logic for the final Radix-8 multiplexor.

While the present invention has been particularly shown and described with respect to preferred embodiments, it will be understood by those skilled in the art that the foregoing and other changes in forms and details may be made without departing from the spirit and scope of the invention. It is therefore intended that the present invention not be limited to the exact forms and details described and illustrated but fall within the scope of the appended claims.

What is claimed is:

1. A 3× generation circuit comprising:
   an input for receiving a single n-bit multiplicand comprising bits a[n−1:0];
   logic device for isolating groups of adjacent bits of said single n-bit multiplicand, wherein adjacent bits of each group includes a bit a[i] corresponding to a bit location of said single n-bit multiplicand, an adjacent bit a[i+1] of said group corresponds to a bit shifted representation of said single n-bit multiplicand, and an adjacent bit a[i−1], said groups of adjacent bits being obtained for i=0, 1, . . . n−2;
   a parallel prefix adder device employing levels of logic gates forming a carry tree circuit, a first level of logic gates receiving said groups of obtained adjacent bits a[i+1], a[i], a[i−1] for bits i=0, 1, . . . n−2 of said single n-bit multiplicand input, successively generating at each level corresponding Generate terms, Propagate terms and corresponding carry bits resulting from processing said groups at said one or more processing logic levels, said parallel prefix adder device performing an addition based on said generated Generate terms, Propagate terms and corresponding carry bits, wherein an output of said addition comprise bits of a value corresponding to 3× said single n-bit multiplicand.

2. The 3× generation circuit of claim 1, wherein a first level of logic gates of said carry tree circuit are configured to receive said groups of obtained adjacent bits for bits i=0, 1, . . . n−2, and generates second level Generate terms, Propagate terms and corresponding carry bits without generating a first level of Generate and Propagate terms thereby decreasing 3× generation processing time.

3. The 3× generation circuit of claim 2, wherein a second level of logic gates of said carry tree circuit receives said generated second level Generate terms, Propagate terms and corresponding carry bits and generates third level Generate terms, Propagate terms and corresponding carry bits.

4. The 3× generation circuit of claim 2, wherein said carry tree circuit includes $\log_2 n+1$ levels of logic gate devices.

5. The 3× generation circuit of claim 2, wherein said logic device for isolating groups of adjacent bits of said single n-bit multiplicand generates a single group of two adjacent bits a[i] and adjacent bit a[i+1] for input to said first level of logic level gates corresponding to i=0.

6. The 3× generation circuit of claim 2, wherein said logic device for isolating groups of adjacent bits of said single n-bit multiplicand generates multiple groups of three adjacent bits corresponding to said adjacent bits a[i+1], a[i] and a[i−1] of said single n-bit multiplicand, wherein for bits i>0 said multiple groups of three adjacent bits are input to said first level of logic level gates.

7. The 3× generation circuit of claim 6, wherein said first level of logic gates comprise carry tree circuitry configured to compute second logic level Generate terms from a group of adjacent bits from a single n-bit input multiplicand a[n−1:0] according to:

$$G2[i]=a[2*i]\&\&(a[2*i+1]\|a[2*i-1]) \text{ for } i=1,2,\ldots n/2;$$

$$G2[0]=a[0]\&\&a[1] \text{ for } i=0;$$

wherein [2*i] represents two times a value of bit a[i] bit; && represents an AND logic operation and || represents an OR logic operation.

8. The 3× generation circuit of claim 6, wherein said first level of logic gates comprise carry tree circuitry configured to compute second logic level Propagate terms from a group of adjacent bits from a single input multiplicand a[n−1:0] according to:

$$P2[i]=a[2*i]\|(a[2*i+1]\&\&a[2*i-1]) \text{ for } i=1,2,\ldots n/2;$$

$$P2[0]=a[0]\|a[1] \text{ for } i=0;$$

wherein [2*i] represents two times a value of bit a[i] bit; && represents an AND logic operation and || represents an OR logic operation.

9. A 3× generation method comprising:
receiving a single n-bit multiplicand comprising bits a[n−1:0],
isolating groups of adjacent bits of said single n-bit multiplicand, adjacent bits of each group including a bit a[i] corresponding to a bit location of said single n-bit multiplicand, an adjacent bit a[i+1] of said group corresponds to a bit shifted representation of said single n-bit multiplicand, and an adjacent bit a[i−1], said groups of adjacent bits being obtained for i=0, 1, ... n−2;
employing, in a parallel prefix adder device, levels of logic gates forming a carry tree circuit, a first level of logic gates receiving said groups of obtained adjacent bits a[i+1], a[i], a[i−1] for bits i=0, 1, ... n−2 of said single n-bit multiplicand input, and successively generating at each level corresponding Generate terms, Propagate terms and corresponding carry bits resulting from processing said groups at said one or more processing logic levels,
said parallel prefix adder device performing an addition based on said generated Generate terms, Propagate terms and corresponding carry bits, wherein an output of said addition comprise bits of a value corresponding to 3× said single n-bit multiplicand.

10. The method of claim 9, comprising:
receiving at a first level of logic gates of said carry tree circuit said groups of obtained adjacent bits for bits i=0, 1, ... n−2; and
generating second level Generate terms, Propagate terms and corresponding carry bits without generating a first level of Generate and Propagate terms, thereby decreasing 3× generation processing time.

11. The method of claim 10, comprising:
receiving at a second level of logic gates of said carry tree circuit said generated second level Generate terms, Propagate terms and corresponding carry bits; and
generating third level Generate terms, Propagate terms and corresponding carry bits.

12. The method of claim 10, configuring said carry tree circuit to include $\log_2 n+1$ levels of logic gate devices.

13. The method of claim 10, wherein said isolating groups of adjacent bits of said single n-bit multiplicand comprises:
generating a single group of two adjacent bits a[i] and adjacent bit a[i+1] for input to said first level of logic level gates corresponding to i=0.

14. The method of claim 10, wherein said isolating groups of adjacent bits of said single n-bit multiplicand comprises:
generating multiple groups of three adjacent bits corresponding to said adjacent bits a[i+1], a[i] and a[i−1] of said single n-bit multiplicand, wherein for bits i>0, said multiple groups of three adjacent bits are input to said first level of logic level gates.

15. The method of claim 14, further comprising:
configuring said first level of logic gates of said carry tree circuitry to compute second logic level Generate terms from a group of adjacent bits from a single n-bit input multiplicand a[n−1:0] according to:

$$G2[i]=a[2*i]\&\&(a[2*i+1]\|a[2*i-1]) \text{ for } i=1,2,\ldots n/2;$$

$$G2[0]=a[0]\&\&a[1] \text{ for } i=0;$$

wherein [2*i] represents two times a value of bit a[i] bit; && represents an AND logic operation and || represents an OR logic operation.

16. The method of claim 14, further comprising:
configuring said first level of logic gates of said carry tree circuitry to compute second logic level Propagate terms from a group of adjacent bits from a single input multiplicand a[n−1:0] according to:

$$P2[i]=a[2*i]\|(a[2*i+1]\&\&a[2*i-1]) \text{ for } i=1,2,\ldots n/2;$$

$$P2[0]=a[0]\|a[1] \text{ for } i=0;$$

wherein [2*i] represents two times a value of bit a[i] bit; && represents an AND logic operation and || represents an OR logic operation.

17. A Radix-8 Booth multiplier device comprising:
a Radix-8 Partial Product Generator circuit (PPG) employing a multiplexor device for receiving each of prior computed 1×, 2×, 4× times partial product values of a single n-bit multiplicand;
a 3× generation circuit, said 3× generation circuit comprising:
an input for receiving said single n-bit multiplicand comprising bits a[n−1:0];
logic device for isolating groups of adjacent bits of said single n-bit multiplicand, wherein adjacent bits of each group includes a bit a[i] corresponding to a bit location of said single n-bit multiplicand, an adjacent bit a[i+1] of said group corresponds to a bit shifted representation of said single n-bit multiplicand, and an adjacent bit a[i−1], said groups of adjacent bits being obtained for i=0, 1, . . . n−2;

a parallel prefix adder device employing levels of logic gates forming a carry tree circuit, a first level of logic gates receiving said groups of obtained adjacent bits a[i+1], a[i], a[i−1] for bits i=0, 1, . . . n−2 of said single n-bit multiplicand input, and successively generating at each level corresponding Generate terms, Propagate terms and corresponding carry bits resulting from processing said groups at said one or more processing logic levels, said parallel prefix adder device performing an addition based on said generated Generate terms, Propagate terms and corresponding carry bits, wherein an output of said addition comprise bits of a value corresponding to 3× said single n-bit multiplicand, said multiplexor device receiving said output 3× value as a 3× partial product value of said single n-bit multiplicand; and an encoding device providing select control signals for input to said multiplexor device to obtain one or more computed 1×, 2×, 3× and 4× partial product terms needed for a radix-8 booth multiplication operation.

18. The Radix-8 Booth multiplier device of claim 17, further comprising:

logic circuitry receiving further control signals from said encoding device for producing any −1×, −2×, −3×, −4× partial product terms needed for the radix-8 booth multiplication.

19. The Radix-8 Booth multiplier device of claim 17, wherein said carry tree circuit of said 3× generation circuit comprises $\log_2 n+1$ levels of logic gate devices, wherein a first level of logic gates are configured to receiving said groups of obtained adjacent bits for bits i=0, 1, . . . n−2 and generates second level Generate terms, Propagate terms and corresponding carry bits without generating a first level of Generate and Propagate terms thereby decreasing 3× generation processing time;

a second level of logic gates receiving said generated second level Generate terms, Propagate terms and corresponding carry bits; and generating third level Generate terms, Propagate terms and corresponding carry bits.

\* \* \* \* \*